(12) United States Patent
Succar et al.

(10) Patent No.: US 8,962,056 B2
(45) Date of Patent: Feb. 24, 2015

(54) FIBER PARTICLE SIZE REDUCTION IN FIBER-CONTAINING FOOD SLURRIES

(75) Inventors: Jorge K. Succar, Yorba Linda, CA (US); Jerry J. Costales, Fullerton, CA (US); Khaled Khatib, Omaha, NE (US); Jennifer R. Mancuso, Omaha, NE (US)

(73) Assignee: ConAgra Foods EDM, Inc., Omaha, NE (US)

(*) Notice: Subject to any disclaimer, the term of this patent is extended or adjusted under 35 U.S.C. 154(b) by 0 days.

(21) Appl. No.: 13/580,447

(22) PCT Filed: Feb. 26, 2010

(86) PCT No.: PCT/US2010/025641
§ 371 (c)(1),
(2), (4) Date: Nov. 6, 2012

(87) PCT Pub. No.: WO2011/106022
PCT Pub. Date: Sep. 1, 2011

(65) Prior Publication Data
US 2013/0045315 A1 Feb. 21, 2013

(51) Int. Cl.
*A23P 1/00* (2006.01)
*A23L 2/02* (2006.01)
(Continued)

(52) U.S. Cl.
CPC ............ *A23L 2/02* (2013.01); *A23L 1/2128* (2013.01); *A23L 1/243* (2013.01); *A23L 1/308* (2013.01); *A23L 1/39* (2013.01)
USPC ........... 426/519; 426/638; 426/399; 426/231; 426/232; 426/521

(58) Field of Classification Search
CPC ....... A23L 1/2128; A23L 1/243; A23L 1/308; A23L 1/39; A23L 2/02; A23L 1/212
USPC ......... 426/615, 589, 519, 518, 520, 638, 399, 426/231, 232, 521
See application file for complete search history.

(56) References Cited

U.S. PATENT DOCUMENTS 3,549,384 A * 12/1970 Bosy et al. ...................... 426/589
4,410,549 A * 10/1983 Baker .............................. 426/43
(Continued)

FOREIGN PATENT DOCUMENTS

| EP | 0337010 | * 1/1992 | ............ A23L 1/187 |
| EP | 0 736 262 B1 | 7/1999 | |

(Continued)

OTHER PUBLICATIONS

Wu et al., "Effect of thermosonication on quality improvement of tomato juice", Innovative Food Science & Emerging Technologies, vol. 9, Issue 2, Apr. 2008, pp. 186-195.

(Continued)

*Primary Examiner* — Drew Becker
*Assistant Examiner* — Preston Smith
(74) *Attorney, Agent, or Firm* — Ryan T. Grace; Advent, LLP

(57) ABSTRACT

Techniques are described to increase product viscosity in fiber-containing food slurries having a given amount of food solids. The techniques employ one or more PSR operations as the last unit operation prior to filling to reduce particle size within the food slurry and increase product viscosity. In one or more implementations, the PSR operation may comprise an aseptic cold PSR operation such as aseptic cold homogenization. In embodiments, the PSR operation may further be controlled to reduce variability in the viscosity of the finished product.

19 Claims, 5 Drawing Sheets

(51) Int. Cl.
*A23L 1/212* (2006.01)
*A23L 1/24* (2006.01)
*A23L 1/308* (2006.01)
*A23L 1/39* (2006.01)

(56) References Cited

U.S. PATENT DOCUMENTS

| | | | | |
|---|---|---|---|---|
| 5,229,159 | A | * | 7/1993 | Schwan .................... 426/587 |
| 5,436,022 | A | | 7/1995 | Chiang et al. .................. 426/626 |
| 5,849,350 | A | | 12/1998 | Ashourian .................... 426/615 |
| 5,965,190 | A | * | 10/1999 | Gallaher et al. .............. 426/615 |
| 6,494,608 | B1 | | 12/2002 | Retamal et al. ................ 366/132 |
| 7,070,826 | B2 | | 7/2006 | Lidster et al. .................. 426/615 |
| 2004/0224069 | A1 | * | 11/2004 | Aird et al. ..................... 426/582 |
| 2005/0038761 | A1 | | 2/2005 | Martin ............................ 706/13 |
| 2005/0169970 | A1 | * | 8/2005 | Aquino ......................... 424/439 |
| 2006/0008570 | A1 | * | 1/2006 | Shidara et al. ................ 426/582 |
| 2006/0110503 | A1 | | 5/2006 | Bates et al. .................... 426/238 |
| 2008/0032029 | A1 | * | 2/2008 | Aquino et al. ................ 426/589 |
| 2009/0311405 | A1 | | 12/2009 | Marasso ........................ 426/565 |

FOREIGN PATENT DOCUMENTS

EP 1 562 446 B1 3/2007
WO WO 2004/039175 A1 5/2004

OTHER PUBLICATIONS

Patist et al., "Ultrasonic innovations in the food industry: From the laboratory to commercial production", Innovative Food Science & Emerging Technologies, vol. 9, Issue 2, Apr. 2008, pp. 147-154.
Komsta et al., "Pressure homogenization in fruit-vegetable processing industry", International Agrophysics, 1999, vol. 13, No. 3, pp. 363-368.
Bayod et al. "Low Shear Rheology of Concentrated Tomato Products. Effect of Particle Size and Time", Food Biophysics, Dec. 2007, vol. 2, No. 4, pp. 146-157.
Tangletpaibul et al., "Rheological Properties of Tomato Concentrates as Affected by Particle Size and Methods of Concentration", Journal of Food Science, 1987, vol. 52, Issue 1, pp. 141-145.
Yoo, et al., "Effect of unimodal particle size and pulp content on rheological properties of tomato puree", Journal of texture studies, 1994, vol. 25, No. 4, pp. 421-436.
Sato et al., "Effect of particle size on rheological properties of jaboticaba pulp", Journal of Food Engineering, vol. 91, Issue 4, Apr. 2009, pp. 566-570.
çiftçi et al., "Colloidal stability and rheological properties of sesame paste", Journal of Food Engineering, vol. 87, Issue 3, Aug. 2008, pp. 428-435.
Vercet et al., "The effects of manothermosonication on tomato pectic enzymes and tomato paste rheological properties", Journal of Food Engineering, vol. 53, Issue 3, Jul. 2002, pp. 273-278.
Sanchez et al., "Influence of processing on the rheological properties of tomato paste" Journal of the Science of Food and Agriculture, vol. 82, No. 9, Jul. 2002, pp. 990-997(8).
Bayod et al., "Rheological and structural characterization of tomato paste and its influence on the quality of ketchup", LWT-Food Science and Technology, vol. 41, Issue 7, Sep. 2008, pp. 1289-1300.
Saroba et al., "Chemical, sensory and rheological properties of some commercial German and Egyptian tomato ketchups", European Food Research and Technology, Feb. 2005, vol. 220, No. 2, pp. 142-151.
International Search Report mailed Sep. 7, 2012, in Application No. PCT/US2010/025641.
International Search Report mailed Apr. 16, 2010, in Application No. PCT/US2010/025641.

* cited by examiner

FIBER PARTICLE SIZE REDUCTION IN FIBER-CONTAINING FOOD SLURRIES

This application is a 371 national stage filing of PCT International Patent Application No. PCT/US2010/025641.

BACKGROUND

Food slurries such as sauces and purees often contain natural fibers such as cellulose, hemicelluloses, and pectin. High shear processes employing particle size reduction (PSR) equipment such as homogenizers, colloidal mills, sonolators, high shear pumps, and so on reduce the fiber particle size of natural fibers to increase viscosity and texture. Viscosity increases with reduced particle size due to a variety of factors such as increased water holding capacity, pectin dispersion, formation of random three dimensional matrixes of fibers, and pectin entrapment by solutes and water.

Commercial processing techniques used in the processing of fiber-containing food slurries employ a hot PSR operation (e.g., hot homogenization) to improve viscosity and texture (e.g., coarseness) of the slurries prior to cooling of the slurries for cold filling. Cold filling provides many advantages compared to hot-fill-hold or retort-based processes, such as faster cooling rates, reduced cooling water use, the tendency to retain natural product quality and nutrients, and so on.

Tomato slurries are a common type of fiber-containing food slurry that is used in the manufacture of tomato ketchup, tomato puree, tomato sauce, tomato soup, and so on. Conventional tomato processing techniques homogenize tomato slurries at temperatures greater than 140° F. (typically around 180° F.) since the effect of the homogenization pressure at higher temperatures delivers a larger reduction in particle size in the slurry, resulting in a thicker finished product. The viscosity of the homogenized slurries can vary significantly depending on the fiber content, fiber geometry, fiber composition (e.g., hemicelluloses, cellulose, pectin, etc.) as well as complex interactions with formula concentration and operating conditions.

Homogenized food slurries are also generally shear thinning. Therefore, the viscosity of the homogenized slurries is reduced as the material is pumped through pipes, heat exchangers, and so on, which connect the discharge of the homogenizer to the filler apparatus. This loss of viscosity is variable and adversely affects the quality of the finished food slurry.

SUMMARY

Techniques are described to increase product viscosity in fiber-containing food slurries having a given amount of food solids. The techniques employ one or more PSR operations as the last unit operation prior to filling to reduce fiber particle size within the food slurry and increase product viscosity. In one or more implementations, the PSR operation may comprise a cold PSR operation such as cold homogenization. The cold PSR operation may be aseptic or non-aseptic. In embodiments, the PSR operation may further be controlled to reduce variability in the viscosity of the finished product.

This Summary is provided solely to introduce subject matter that is fully described in the Detailed Description and Drawings. Accordingly, the Summary should not be considered to describe essential features nor be used to determine scope of the claims.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Figure 1:
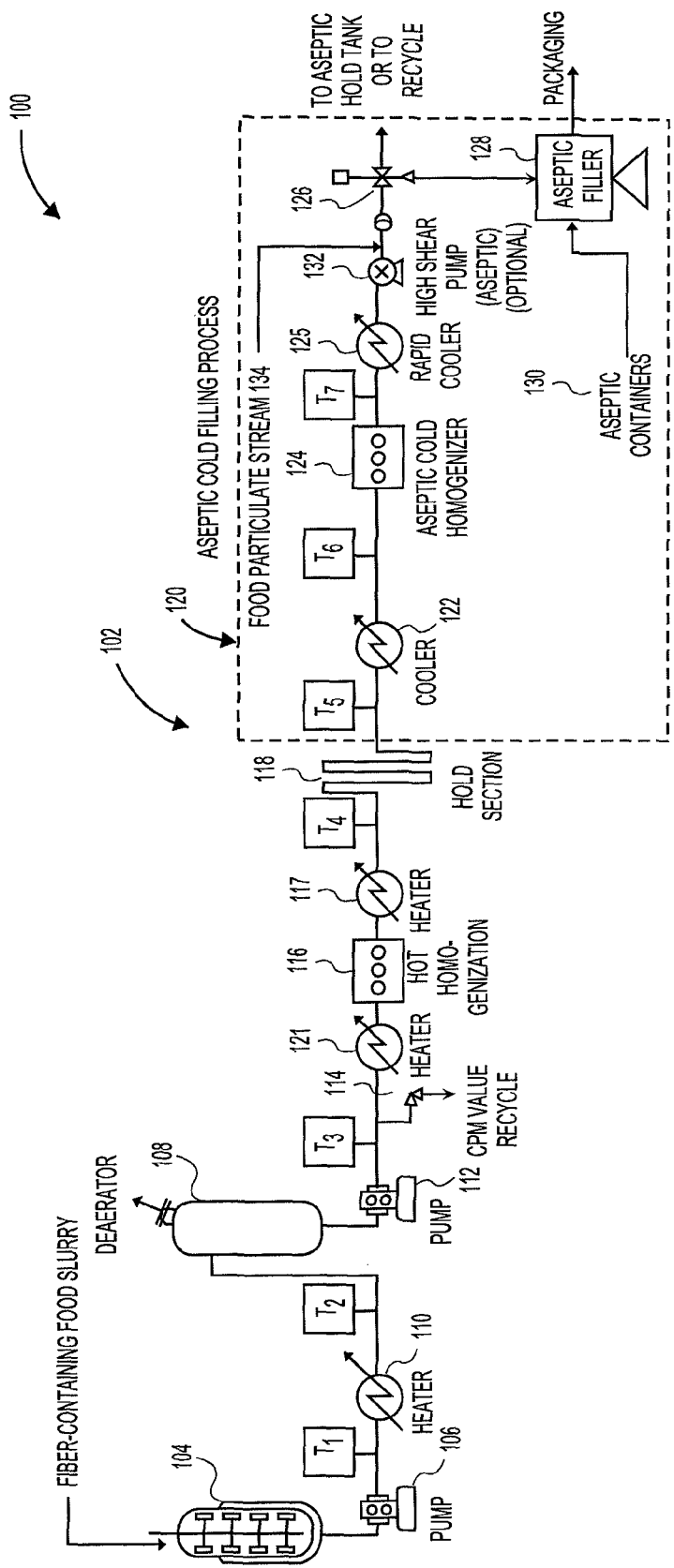
FIG. 1 is an illustration of an environment in an example implementation that includes a processing system configured to implement techniques to increase product viscosity in fiber-containing food slurries having a given amount of food solids.

A phenomenon encountered during the processing of fiber-containing food slurries such as sauces and purees is shear thinning. Shear thinning is an effect where viscosity decreases with increasing shear time exposure to laminar or turbulent flow in pipes, elbows, and so on. For example, the viscosity of homogenized or milled tomato slurries is reduced as the material is pumped through pipes, heat exchangers, and so on, which connect the discharge of the homogenizer to the filler apparatus. Although not wishing to be bound by a particular theory, it is believed that this loss of viscosity is due to realignment of the random cross-linked fiber matrix induced immediately after homogenization and that random fiber matrix orientation is required to maintain the viscosity gained at the discharge of the homogenizer.

Commercial processing techniques used in the processing of fiber-containing food slurries, in particular acidic or acidified food slurries such as tomato slurries, employ a hot PSR operation (e.g., hot homogenization) to improve viscosity and texture (e.g., coarseness) of the slurries prior to cooling of the slurries for cold filling. Cold filling provides many advantages compared to hot-fill-hold or retort-based processes, such as faster cooling rates, reduced cooling water use, the tendency to retain natural product quality and nutrients, and so on.

Under practical commercial applications, tomato slurries are pumped through pipes and heat exchangers to transfer the product from the hot homogenization operation to the filler apparatus. The food slurry can be further handled through product recycling in the event that a unit operation after the homogenizer (e.g., filler, packaging equipment, etc.) malfunctions. Therefore, finished homogenized products experience reduced product viscosity and variability in finished product viscosity based on the amount of recirculation.

Accordingly, techniques are described to increase product viscosity in fiber-containing food slurries having a given amount (ratio) of food fiber to soluble solids. In embodiments, the ratio of food fiber to soluble solids comprises about 0.05 to about 2, about 0.1 to about 2, about 0.05 to about 1, about 0.1 to about 1, about 0.05 to about 0.5, about 0.1 to about 0.5, about 0.2 to about 0.5, or about 0.3 to about 0.5. In embodiments, the ratio of food fiber to soluble solids comprises about 2, about 1.5, about 1, about 0.9, about 0.8, about 0.7, about 0.6, about 0.5, about 0.4, about 0.3, about 0.2, about 0.1, about 0.09, about 0.08, about 0.07, about 0.06, or about 0.05. Fiber-containing food slurries include any fiber-containing sauce or puree that exhibits shear thinning during processing. In particular, fiber-containing food slurries containing natural and/or added fiber include, but are not limited to, prepared tomato slurries such as ketchup (catsup), tomato-based barbeque sauces, tomato-based steak sauces, tomato sauces, tomato purees, tomato soups, and so on. However, fiber-containing food slurries also include, but are not limited to, vegetable slurries including but not limited to carrot slurries and bean slurries, soups, and so on, as well as food slurries that contain a fiber additive to increase viscosity. A fiber-containing food slurry may include ingredients such as spices, sweeteners, flavorings, preservatives, and so forth.

The techniques described herein employ one or more cold PSR operations as the last unit operation prior to filling to reduce fiber particle size dispersed within the food slurry so that product viscosity. is increased. The one or more cold PSR operations can be aseptic or non-aseptic. The cold PSR operation may cause a reduction in the particle size by at least about 10 micron or more. In embodiments, the cold PSR operation reduces the particle size by about 10 microns to about 50 microns, about 10 microns to about 60 microns, about 10 microns to about 70 microns, about 10 microns to about 80 microns, about 10 microns to about 90 microns, or about 10 microns to about 100 microns. In embodiments, the cold PSR operation reduces the particle size by about 20 microns to about 50 microns, about 20 microns to about 60 microns, about 20 microns to about 70 microns, about 20 microns to about 80 microns, about 20 microns to about 90 microns, or about 20 microns to about 100 microns. In embodiments, the cold PSR operation reduces the particle size by about 30 microns to about 50 microns, about 30 microns to about 60 microns, about 30 microns to about 70 microns, about 30 microns to about 80 microns, about 30 microns to about 90 microns, or about 30 microns to about 100 microns. In embodiments, the cold PSR operation reduces the particle size by about 40 microns to about 50 microns, about 40 microns to about 60 microns, about 40 microns to about 70 microns, about 40 microns to about 80 microns, about 40 microns to about 90 microns, or about 40 microns to about 100 microns.

In embodiments, the cold PSR operation increases the viscosity of the food slurry compared to a hot PSR operation. The cold PSR operation may cause an increase in viscosity by at least about 10 percent or more. In embodiments, the cold PSR operation increases the viscosity by about 10 percent to about 50 percent, by about 10 percent to about 40 percent, by about 10 percent to about 30 percent, or by about 10 percent to about 20 percent.

The amount of solids in the food slurry may be reduced as the cold PSR operation allows for increased viscosity compared to conventional hot PSR operations. Therefore, a food slurry containing less solids and processed in the cold PSR operation may achieve a similar or higher viscosity compared to a food slurry containing more solids and processed in a conventional hot PSR operation. In embodiments, the percent of solids in the food slurry may be reduced by up to 0.5 percent, 2 percent, 4 percent, 6 percent, 8 percent, 10 percent, 12 percent, 15 percent, 20 percent, 25 percent, or 30 percent by weight of the food slurry. Table 1 shows examples of simplified puree solid reductions according to the cold PSR processes of the invention.

TABLE 1

| Puree Composition | Hot PSR Process | Cold PSR Process Solids Reduction at Constant Velocity | | | | | | | | |
|---|---|---|---|---|---|---|---|---|---|---|
| | | 0.5% | 2.0% | 4.0% | 6.0% | 8.0% | 10.0% | 12.0% | 15.0% | 20.0% | 25.0% |
| Puree fiber solids | 2.50 | 2.49 | 2.45 | 2.40 | 2.35 | 2.30 | 2.25 | 2.20 | 2.13 | 2.00 | 1.88 |
| Other puree solids | 10.00 | 9.95 | 9.80 | 9.60 | 9.40 | 9.20 | 9.00 | 8.80 | 8.50 | 8.00 | 7.50 |
| Added Ingredients | 2.00 | 2.06 | 2.25 | 2.50 | 2.75 | 3.00 | 3.25 | 3.50 | 3.88 | 4.50 | 5.13 |
| Water | 85.50 | 85.50 | 85.50 | 85.50 | 85.50 | 85.50 | 85.50 | 85.50 | 85.50 | 85.50 | 85.50 |
| Total | 100.00 | 100.00 | 100.00 | 100.00 | 100.00 | 100.00 | 100.00 | 100.00 | 100.00 | 100.00 | 100.00 |

The cold PSR operation may further allow for modulation of the viscosity of the food slurry to reduce variability in the viscosity of the finished food slurry. The techniques may be applied in cold filled processes, hot filled processes, or retort processes.

In embodiments, the PSR operation is located in close proximity to the filler operation. For example, in cold fill process applications, the PSR operation may employ aseptic PSR equipment to prevent post process contamination and ensure delivery of safe shelf stable or extended shelf-life (ESL) food. For example, the PSR operation may comprise a cold homogenization process employing a cold homogenizer, an aseptic cold homogenizer, or like equipment.

In the following discussion, an example processing environment is first described. Exemplary procedures are then described that may be employed with the example environment, as well as with other environments and devices without departing from the spirit and scope thereof. An example control loop suitable for controlling the viscosity of the food slurry to reduce variability in the viscosity of the food slurry when packaged is presented. Examples are then presented illustrating the effect of the cold PSR operation on the fiber particle size and viscosity of sample fiber-containing food slurries processed in accordance with the techniques described herein.

Example Environment

FIG. 1 illustrates an environment 100 in an example implementation that includes a food processing system 102 configured to implement techniques to increase product viscosity in a fiber-containing food slurry using a cold PSR operation. FIG. 1 provides an overview of the food processing system 102. However, the food processing system 102 may include various configurations without departing from the functionality set forth in this description. The elements depicted in FIG. 1 and functionality described can be integrated into the processing stream as single elements and/or combinations elements that include multiple functionalities. For example, in FIG. 1, various elements and arrows between elements are depicted for purposes of explaining aspects of functionality and not necessarily for indicating where the elements structurally "reside" or that the elements are single entities within the flow. It is contemplated that the elements can include combination devices performing multiple functions and/or a single device performing a single function. Unless otherwise indicated, it is further contemplated that the elements indicated in FIG. 1 can be located in a myriad of facility locations depending on desire, processing efficiencies, economics, and so on. The depiction in FIG. 1 of the categorized and named elements is merely for facilitating a logical flow of the description of the processing system environment 100 as set forth herein.

The food processing system 102 is configured to process and bottle or otherwise package of low acid, acid or acidified fiber-containing food slurries that have been prepared, blended, and cooked using cooking processes appropriate for the food product. In embodiments, the food slurry may comprise an acidic slurry (e.g., sauce, puree, or the like) having a pH that is less than 4.2. For example, the food slurry may be a tomato-based food slurry (e.g., ketchup, tomato sauce, tomato paste, etc.), which may contain sweeteners, vinegar, salt, spices, and/or flavorings that are added to tomato pulp and then cooked. Once cooked, the mixture is passed through a finishing machine that removes excess fiber and particles through screens, creating a smooth consistency. The mixture is then conveyed to the mixing/holding tank 104 for processing as described below.

The food slurry is pumped from the mixing/holding tanks 104 by a fluid transfer pump 106 such as a positive displacement (PD) pump, a centrifugal pump, a peristaltic, diaphragm pump, and so on. As shown, the fluid transfer pump 106 pumps the food slurry through a heater 110 where the food slurry is heated to enhance gas diffusion within puree to optimize removal of occluded and/or dissolved oxygen during deaeration. The amount of heating required may depend on a number of factors, such as the type of food slurry being processed, and so on. In an example, for acid or acidified food the slurry may have a temperature ($T_1$) of about 100° F. when pumped from the holding tank 104 by the fluid transfer pump 106. The heater 110 heats the food slurry until the food slurry reaches a temperature ($T_2$) of about 200° F. Other examples are possible.

A variety of techniques may be employed by the heater 110 to heat the food slurry. For example, the food slurry may be passed through a heat exchanger or pumped into a holding tank having a steam jacket where it is heated. In some instances, the food slurry may be sufficiently hot when pumped from the holding tank 104 so that further heating may be unnecessary. In such instances, the heater 108 may be turned off or eliminated from the processing system 102.

Deaeration is optional but desirable in most instances to protect product quality and nutrition. The deaerator 108 removes oxygen from air from the food slurry to prevent oxidation during the shelf life of the puree and its consequent discoloration (typically browning reactions). Excess oxygen can also create unattractive air pockets in the food slurry when bottled or otherwise packaged in a jar, can, pouch, and the like. In one embodiment, a vacuum de-aerator may be used to de-aerate the food slurry. However, it is contemplated that various other deaeration technologies may be employed.

The food slurry is then pumped from the deaerator 108 by a second fluid transfer pump 112 such as a positive displacement (PD) pump, a centrifugal pump, a peristaltic, diaphragm pump, and so on. The temperature. ($T_3$) of the food slurry following deaeration may vary depending on the type of food slurry being processed and the configuration and type of deaerator used. In an example, the food slurry may have a temperature ($T_3$) of about 185° F. when pumped from the deaerator 110.

At this point in the processing system 102, a constant pressure modulating (CPM) valve 114 may be provided to modulate the pressure of the food slurry. The CPM valve 114 may also allow the food slurry to be removed from the processing system 102 following deaeration. The food slurry may then be recycled through the processing system 102 at a later time.

The food slurry is subjected to a hot PSR operation to reduce particle size and increase viscosity of the food slurry. For example, the processing system 102 shown includes a homogenizer 116 configured to perform hot homogenization on the food slurry. The homogenizer 116 may be configured to operate at a variety of pressures and/or temperatures. In one example, the food slurry may be homogenized at a pressure of about 3000 psig. However, it is contemplated that hot homogenization may be performed on the food slurry at pressures of up to about 5000 psig. Further, for products where overly smooth characteristics are not desired, the homogenization pressure can be reduced to about 500 to about 1,000 psig resulting in a modest increase in viscosity without significant change in product coarseness. Homogenization technology exists that can achieve pressures in excess of 95,000 psig. Although homogenizers employing such technology are expensive to operate and maintain, it is contemplated that such high pressure homogenizers can be employed by processing system 102.

The temperature of the food slurry ($T_4$) following hot homogenization by homogenizer 116 may vary depending on factors such as the type of food slurry being processed, the type and configuration of the homogenizer 116, the desired characteristics (e.g., viscosity, particle size, etc.) following homogenization, and so on. In the acid or acidified food implementation illustrated, the food slurry may have a temperature ($T_4$) of at least approximately 190° F. exiting the hot homogenization 116. A subsequent heater 117 (e.g., a heat exchanger, a holding tank having a steam jacket, etc.) may be used to achieve target pre-hold tube temperature. Low acid foods may employ higher temperatures to destroy anaerobic bacteria (e.g., Clostridium Botulinum strains). In low acid foods, pre-hold loop temperatures exiting heater 117 may be in the range of about 250° F. to about 300° F. and hold loop times could be as short as a few seconds up to about 10 minutes depending on selected temperature. Hold loop length can be adjusted as required. Therefore, in such embodiments, the food slurry may held at a prescribed temperature for a duration of time (e.g., at least about 10 minutes) in a hold section 118 so that the food slurry is pasteurized (pH<4.6) or rendered commercially sterile in the case of low acid foods (pH 4.60). The food slurry exiting hold section 118 may now enter an aseptic or non-aseptic cold filling environment 120 to be packaged as described in more detail below.

It contemplated that in some implementations, the food slurry may not have a suitable temperature for homogenization following deaeration. In such implementations, the food slurry may be heated (e.g., by heater 121) prior to hot homogenization by homogenizer 116 since the effect of the homogenization pressure at higher temperatures delivers a larger reduction in particle size. In an example, the acid or acidified food slurry may be heated to a temperature in the range of about 150° F. to about 200° F. prior to the hot homogenization. A variety of techniques may be employed by the heater 121 to heat the food slurry. For example, the food slurry may be passed through a heat exchanger or pumped into a holding tank having a steam jacket where it is heated.

As shown in FIG. 1, the food slurry is cooled as it enters the aseptic cold filling environment. Where the food slurry has been pasteurized following homogenization, the food slurry may have a temperature ($T_5$) of about 150° F. to about 200° F. following pasteurization. The food slurry may be cooled using a suitable cooler (e.g., cooler 122) to a temperature ($T_6$) of about 100° F. or over the range of temperatures within about 40° F. to about 130° F. A variety of techniques may be employed to cool the food slurry. For example, the food slurry may be passed through a heat exchanger or pumped into a refrigerated holding tank where it is chilled or maintained at prescribed cold temperatures of about 40° F. to about 130° F.

In accordance with the present disclosure, the food slurry is subjected to a cold PSR operation to further reduce particle size and increase viscosity of the food slurry. In one or more implementations, the cold PSR operation may be a cold homogenization process, cold milling process, cold sonication process, high shear mixers with PSR capabilities greater than about 5.0 microns, and so on. The cold PSR operation can be aseptic or non-aseptic. For example, the processing system 102 shown includes a cold homogenizer 124 configured to perform cold homogenization on the food slurry.

The cold homogenizer 124 may be configured to operate at a variety of pressures and/or temperatures. In one example, the food slurry may be homogenized at pressures of up to 5000 psig. For instance, the food slurry may be homogenized at a pressure of about 3000 psig to about 3600 psig. Homogenizers with higher homogenization pressure capabilities nearing about 15,000 psig can be used depending on fiber composition, homogenization temperature, or other food properties. Similarly, the food slurry may be cold homogenized at a temperature in the range of about 40° F. to about 130° F. However, it is contemplated that cold homogenization of the food slurry may be accomplished at temperatures outside of this range. For example, the food slurry may be cooled to a temperature as low as about 35° F. due to ambient conditions. Similarly, it is possible that the food slurry may be cold homogenized at higher temperatures provided they are rapidly cooled by using cooling apparatus 125 such indirect cryogenic heat exchangers, chilled water or glycol cooling, and so on. For example, the food slurry can be cold homogenized at a temperature of about 140° F. to about 200° F. in this way.

During cold homogenization, the temperature of the food slurry may rise due to friction. For example, following cold homogenization at a temperature in the range of about 90° F. to about 125° F., the temperature of the food slurry may rise to a temperature in the range of about 140° F. to about 150° F. depending on homogenization pressure and other related friction factors related to composition and other rheological food properties. As the food slurry is pumped from the cold homogenizer 124, the food slurry may cool due to natural heat losses or cooling could be enhanced through indirect cryogenic cooling, for example. For instance, in the example just described, the food slurry may cool from a temperature ($T_6$) in the range of about 140° F. to about 150° F. to a temperature in the range of about 120° F. to about 130° F. without installing an accelerated cooling operation.

The food slurry is pumped to a valve assembly 126, which transfers the food slurry to an aseptic filler apparatus 128. The, filler apparatus 128 places the food slurry in aseptic containers 130 such as bottles, jars, pouches, cans, or the like, and caps and/or seals the containers. The containers are then transported to packaging lines where the containers are packaged (e.g., boxed, crated, etc.) for shipping. The valve assembly 126 may alternately transfer the food slurry to an aseptic hold tank to be transferred to the filling apparatus 128 to fill containers 130 at a later time, or to be recycled.

The viscosity of the food slurry generally decreases as the distance between the cold homogenizer 124 and the filler apparatus 128 is increased. Thus, the aseptic PSR operation (e.g., the cold homogenizer 124) may be located in close proximity to the filler operation (e.g., the filler apparatus 128) to mitigate losses in viscosity by the food slurry between the cold PSR operation and filling. In one or more embodiments, the length of line between the cold homogenizer 124 and valve 126 and/or the filler apparatus 128 may be less than about 300 feet, less than about 200 feet, less than about 100 feet, less than about 75 feet, or less than about 50 feet or less than about 20 feet. For example, in one implementation, the length of line between the cold homogenizer 124 and valve 126 and/or the filler apparatus 128 may be about 100 feet. However, shorter lengths of line are contemplated where practically implemented. Moreover, loss of viscosity may further depend on a variety of conditions such as particle concentration, particle size, particle geometry, fluid velocity (shear rate in pipes), the presence of elbows and angles in the line, pipe diameter, temperature and other rheological factors.

Shear devices which may or may not further reduce particle size can be inserted within the process flow prior to or following the cold PSR operation to enhance particle size reduction and maximize thickness. In the implementation shown, the food slurry is pumped through an optional high shear pump 132 to increase viscosity in the food slurry prior to bottling. In FIG. 1, the high shear pump 132 is illustrated as being located between the cold homogenizer and valve 126. However, it is contemplated that high shear pump 132 may also inserted at other locations within the processing system 102, or eliminated from the system 102, depending on the processing requirements of the particular food slurry being produced.

Larger food particulates including, but not limited to: vegetables, vegetable products, meats, meat products, mushrooms, peppers, potatoes, onions, garlic, pasta, rice, and so on, may be added to the food slurry following the cold PSR operation (e.g., following cold homogenization). Thus, a food slurry containing larger food particulates may be produced using the techniques described herein. Examples include, but are not limited to: a pasta sauce containing mushrooms, onions, peppers, or meatballs; a soup containing vegetables, pasta, or rice; or a salsa containing peppers, onions, or garlic.

In the implementation shown in FIG. 1, a food particulate stream 134 containing the larger food particulates is blended with the food slurry following cold homogenization using an in-line blending process. The food slurry, containing the larger food particulates, may then be transferred to the aseptic filler apparatus 128, which places the food slurry in containers 130. In embodiments, the food particulate stream 134 is aseptic (e.g., sterile, pasteurized, etc.) so that the food particulates may be introduced into the food slurry within the aseptic cold filling process and placed in containers 130 without further sterilization. However, it is contemplated that, in some instances, food particulates that are not aseptic (e.g., not sterile or pasteurized) may be added to the food slurry prior to filling. In such instances, the food slurry (containing the larger food particulates) may be subjected to additional sterilization processes. For example, containers 130, once filled, may be subjected to a retort process. Other sterilization processes are possible.

In one or more implementations, the processing system 102 may further include surge tanks (not shown) to reduce recirculation.

Example Processes

Figure 2:
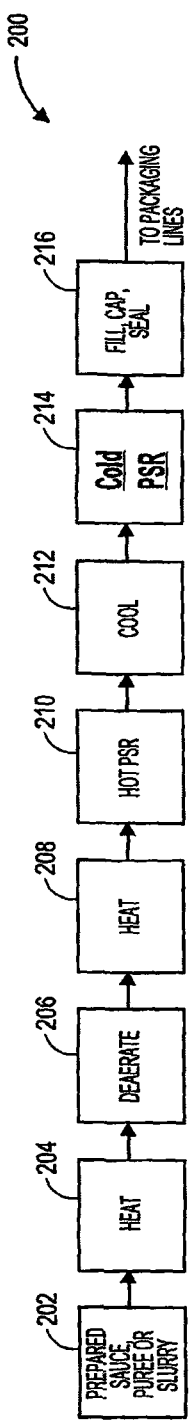
FIG. 2 is a flow diagram illustrating a process to increase product viscosity in fiber-containing food slurries that employs a hot PSR operation and a cold PSR operation.
Figure 3:
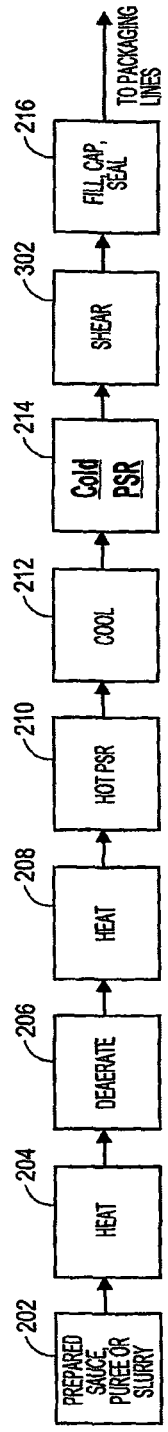
FIG. 3 is a flow diagram illustrating a process to increase product viscosity in fiber-containing food slurries that employs a cold PSR operation and a high-shear operation.
Figure 4:
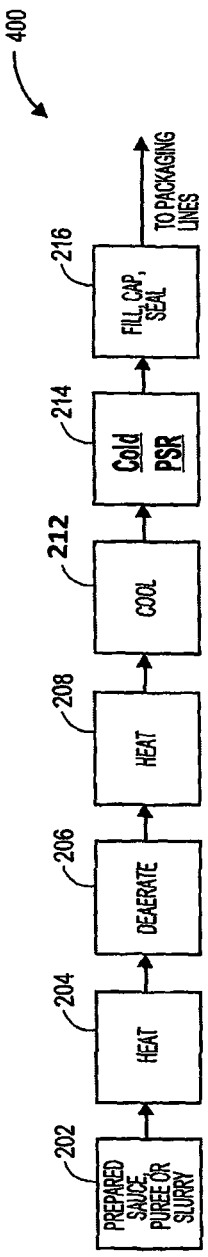
FIG. 4 is a flow diagram illustrating a process to increase product viscosity in a fiber-containing food slurry, wherein the process employs a cold PSR operation.

FIGS. 2, 3, and 4 illustrate example processes 200, 300, 400 that employ a cold PSR operation to increase product viscosity in food slurries containing a given amount of food solids. In the implementations shown, the processes 200, 300, 400 employ aseptic or non-aseptic cold filling techniques. Thus, the food slurry may be packaged in an aseptic (sterile) environment, such as the environment 100 of FIG. 1, so that the containers are sealed under aseptic conditions. However, in other implementations, the processes 200, 300, 400 may employ other packaging processes such as hot-fill-hold process or retort-based processes.

FIG. 2 illustrates a process 200 that employs a hot PSR operation and a cold PSR operation to increase viscosity in the food slurry prior to bottling. The cold PSR operation may be aseptic or non-aseptic. As shown, a mixture of ingredients for the food slurry may be prepared, blended, and cooked using cooking processes appropriate for the food slurry. In operation 202, the prepared food slurry is received for processing. For example, the prepared food slurry may be transferred into one or more holding tanks from which the food slurry is withdrawn so that the operations of process 200 may be performed on the food slurry.

From operation 202, process 200 continues to operation 204 where the food slurry is heated to create necessary gas diffusion enhancements prior to deaeration. As noted in the discussion of FIG. 1, the amount of heating required may depend on a number of factors, such as slurry rheological properties, type of slurry chemistry being processed, the type and configuration of the deaerator, and so on. In an example, the food slurry may have a temperature of about 100° F. when pumped from the holding tank. The food slurry may be heated using a suitable heating apparatus to a temperature of about 170° F. to about 200° F. for deaeration. In some instances, the food slurry may have a suitable temperature when pumped from the holding tanks. In such instances, further heating may be unnecessary and operation 204 may be eliminated from the process 200.

Process 200 continues to operation 206 where the food slurry deaerated. Deaeration operations 206 within the process 200 are optional but desirable to protect product quality and nutrition. As noted, deaeration removes air from the food slurry to prevent oxidation and inhibit the growth of bacteria, and prevents unattractive air pockets in the food slurry when bottled. In one embodiment, a vacuum de-aerator may be used to de-aerate the food slurry. However, it is contemplated that various other deaeration technologies may be employed.

From operation 206, process 200 continues to operation 208 where the food slurry is heated prior to undergoing a hot PSR operation. For example, prior to hot PSR operations such as homogenization, the food slurry may be heated using a suitable heating apparatus to a temperature of greater than about 140° F. In one example, the food slurry may be heated to a temperature of about 185° F. Again, a variety of techniques may be employed to heat the food slurry. For example, the food slurry may be passed through a heat exchanger or pumped into a holding tank having a steam jacket where it is heated. Again, it is contemplated that in some instances, the food slurry may have a suitable temperature following deaeration. In such instances, further heating may be unnecessary and operation 208 may be eliminated from the process 200.

Process 200 continues to operation 210 where the food slurry is subjected to a hot PSR operation (e.g., a hot PSR operation is performed on the food slurry) to reduce particle size and increase viscosity of the food slurry. The hot PSR operation can be a hot homogenization process. In one example, the food slurry may be homogenized at a pressure of about 3000 psig. However, it is contemplated that while hot homogenization is typically performed on the food slurry at pressures of 3,000 psig, the upper limit pressure can be dictated by the capability of the equipment and the desire to achieve smaller particle size or textural properties. Further, for products where overly smooth characteristics are not desired, the homogenization pressure can be reduced to about 500 psig to about 1,000 psig resulting in a modest reduction in particle size and modest increase in viscosity without significant change in product coarseness.

The food slurry may reach a temperature of at least approximately 195° F. following hot homogenization. In embodiments, the food slurry may held at this temperature for a duration of time (e.g., at least about 5 minutes) following operation 210 so that the food slurry is pasteurized or rendered commercially sterile as illustrated in FIG. 1. The food slurry may now enter an aseptic cold filling environment to be packaged.

From operation 210, process 200 continues to operation 212 where the food slurry is cooled. In the example just described, the food slurry may have a temperature of about 190° F. following the hot PSR operation and pasteurization (operation 210). The food slurry may be cooled using a suitable cooling apparatus to a temperature of about 100° F. However, chilling temperatures as low as about 35° F. up to about 130° F. are also considered in this disclosure. A variety of techniques may be employed to cool the food slurry. For example, the food slurry may be passed through a heat exchanger or pumped into a refrigerated holding tank where it is chilled.

In accordance with the present disclosure, process 200 continues to operation 214 where the food slurry is subjected to a cold PSR operation (e.g., a cold PSR operation is performed on the food slurry) to further reduce particle size and increase viscosity of the food slurry as described in more detail below. In one or more implementations, the cold PSR operation may be a cold homogenization process. The cold PSR operation may be aseptic or non-aseptic. Cold homogenization may be performed at a variety of pressures and/or temperatures. In one example, the food slurry may be homogenized at pressures of up to 5000 psig. For instance, the food slurry may be homogenized at a pressure of about 3000 psig to about 3600 psig. Similarly, the food slurry may be cold homogenized at a temperature in the range of about 90° F. to about 125° F. However, it is contemplated that cold homogenization of the food slurry may be accomplished at temperatures outside of this range. For example, the food slurry may be cooled to a temperature as low as about 35° F. due to ambient conditions or for the purpose of improving puree quality retention. Similarly, it is possible that the food slurry may be cold homogenized at higher temperatures by using cooling apparatus such as water spray cooling tunnels, and so on. For example, the food slurry can be cold homogenized at a temperature of about 180° F. in this way provided that rapid cooling is achieved using efficient cooling methods such as indirect cryogenic cooling.

From operation 214, process 200 continues to operation 216 where the food slurry is pumped to a filler apparatus, which places the food slurry in containers such as bottles, jars, pouches, cans, or the like then caps and/or seals the container. The containers are then transported to packaging lines where the containers are packaged for shipping. It is contemplated that, in some instances, the food slurry may also be transferred to an aseptic hold tank for temporary storage, to be transferred to the filling apparatus to fill containers (operation 216) at a later time, or to be recycled.

Following the cold PSR operation (operation 214), the temperature of the food slurry may rise significantly (greater than about 10° F.) due to friction. For example, following cold homogenization at a temperature in the range of about 90° F. to about 125° F., the temperature of the food slurry may rise to a temperature in the range of about 100° F. to about 150° F. depending on homogenization pressure and puree viscosity. As the food slurry is pumped from the cold PSR operation (operation 214) to the filling operation (operation 216), the food slurry may cool due to natural heat losses. For instance, in the implementation described, the food slurry may cool from a temperature in the range of about 140° F. to about 150° F. to a temperature in the range of about 125° F. to about 130° F.

As described in the discussion of FIG. 1, larger food particulates may be added to the food slurry following the cold PSR operation (operation 214). The food slurry, containing the larger food particulates, may then be transferred to the aseptic filler apparatus, which places the food slurry in containers (operation 216). As described, the larger food particulates may be aseptic (e.g., sterile, pasteurized, etc.) so that the food particulates can be introduced into the food slurry within the aseptic cold filling process and placed in containers (operation 216) without further sterilization. The larger food particulates may also be non-aseptic (e.g., not sterile or pasteurized). The food slurry containing the larger food particulates may then be subjected to an additional sterilization processes, such as a retort process following the filling operation (operation 216), or the like.

FIGS. 3 and 4 illustrate processes 300, 400 that are variations of process 200 illustrated in FIG. 2. In FIG. 3, process 300 employs a cold PSR operation and a high-shear operation to increase viscosity in the food slurry prior to bottling. Operations 202 through 216 of process 300 are identical to corresponding operations, operations 202 through 216, of process 200 of FIG. 2. However, process 300 further includes operation 302 where the food slurry is pumped through a high shear pump. In FIG. 3, operation 302 is illustrated as being inserted between operation 214 and operation 216, so that the high shear pump is located between the cold PSR apparatus (e.g., the cold homogenizer) and the filler apparatus. However, it is contemplated that operation 302 may also inserted between other operations. In FIG. 4, process 400 employs a cold PSR operation without a hot PSR operation. Thus, in process 400, operation 210 (as referenced in FIGURES 2 and 3) is eliminated. Operations 202 through 208 and operation 212-216 are identical to corresponding operations, operations 202 through 208 and operation 212-216, of process 200 of FIG. 2.

Viscosity Control

Figure 5:
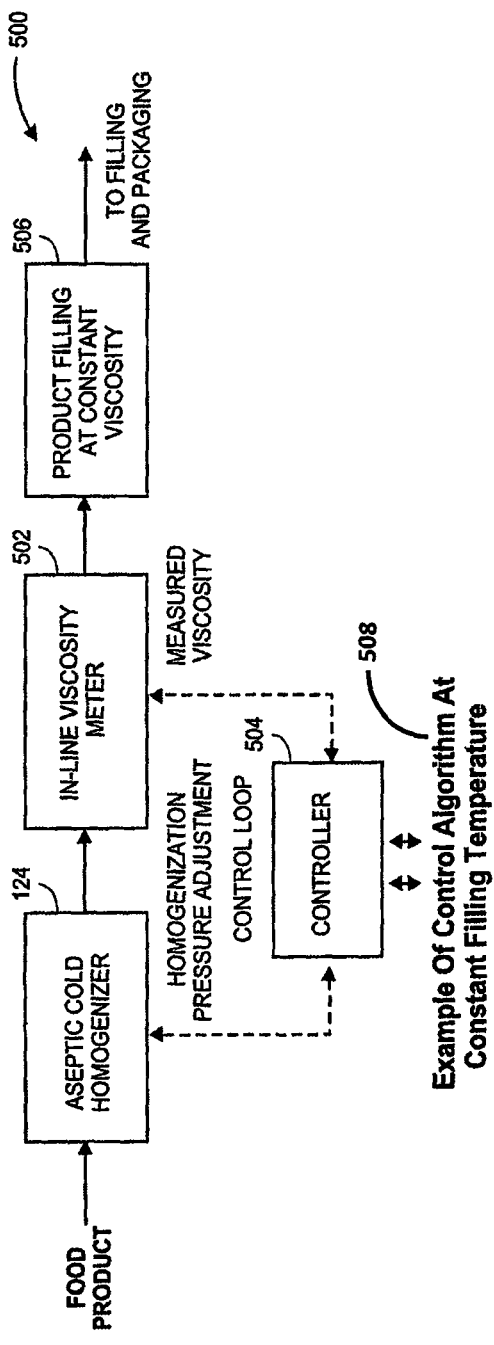
FIG. 5 is a flow diagram illustrating a viscosity control loop that may be employed in the processes illustrated in FIGS. 2, 3 and 4 to reduce variability of the viscosity of fiber-containing food slurries.
Figure 5:
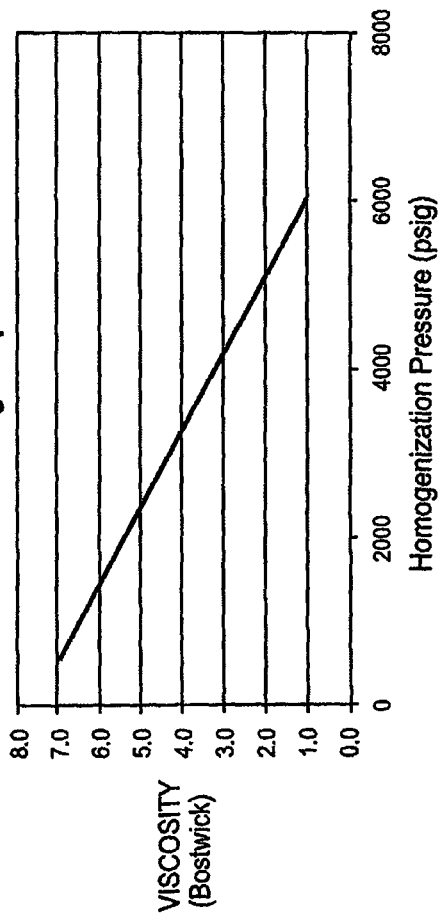

FIG. 5 illustrates a feedback control loop 500 that is configured to control the viscosity of the food slurry. In implementations, the control loop 500 may be implemented in the processing system 102 of the environment 100 shown in FIG. 1 and may be employed by processes 200, 300, 400 of FIGS. 2, 3, and 4 to reduce variability in the viscosity of the food slurry when packaged.

As shown in FIG. 5, the food slurry is subjected to a cold PSR operation such as cold homogenization as described in the discussion of FIGS. 1 through 4 above. The food slurry then passes through an inline viscosity meter 502 such as an inline Bostwick meter or a viscometer. The inline viscosity meter 502 measures the viscosity of the cold homogenized food slurry and generates measured viscosity data that is furnished to a controller 504 such as a programmable logic controller (PLC), a computer, or the like. These measurements are made at a relatively constant temperature (e.g., ±5° F.) unless temperature calibration algorithms are used in controller 504. The controller 504 implements functionality to modulate the viscosity of the food slurry, in response to the measured viscosity indicated by the viscosity meter 502, by causing the pressure of the cold homogenizer 124 to be adjusted. In this manner, variability in the viscosity of the food slurry may be reduced so that the viscosity of the food slurry provided for the filling operation 506 (e.g., provided to filling apparatus 128 (FIG. 1)) may be held substantially constant.

The functionality implemented by the controller 504 employs an algorithm 508 that relates the measured viscosity of the food slurry following cold homogenization with the pressure at which the food slurry was homogenized at constant filling temperature. For instance, in the algorithm 508 shown, the viscosity of the cold homogenized food slurry varies linearly with the homogenization pressure. Thus, when the controller 504 determines that the measured viscosity of the food slurry is too low, the controller may cause the pressure of the cold homogenizer 124 to be increased by an amount determined from algorithm 508, increasing the viscosity of the food slurry by a corresponding amount. Similarly, when the controller 504 determines that the measured viscosity of the food slurry is too high, the controller 504 causes the pressure of the cold homogenizer 124 to be decreased by an amount determined from algorithm 508, decreasing the viscosity of the food slurry by a corresponding amount.

Figure 6:
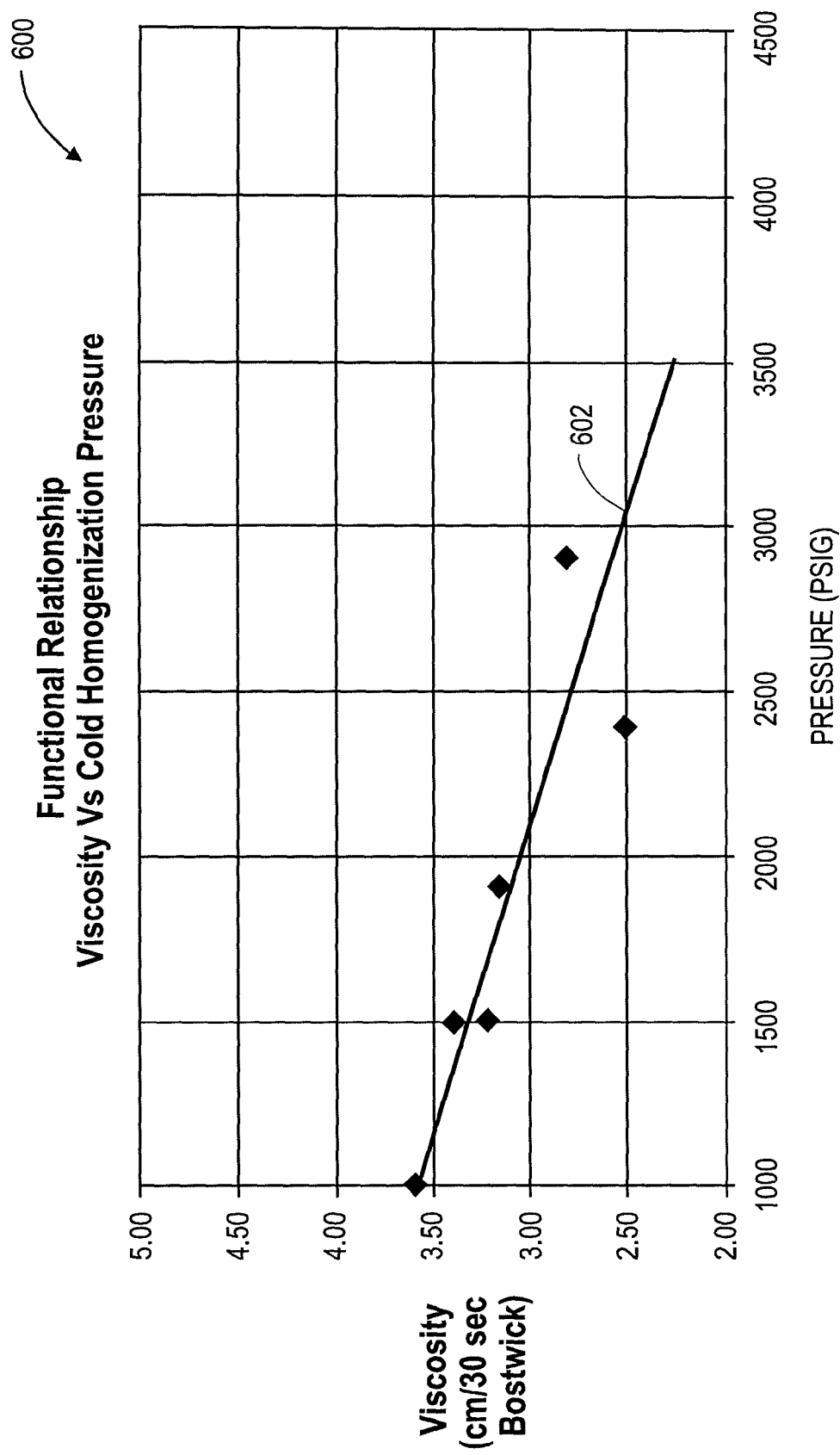
FIG. 6 is a chart illustrating the functional relationship between viscosity (Bostwick) and cold homogenization pressure.

FIG. 6 is a chart 600 that illustrates the relationship between viscosity and cold homogenization pressure for a sample of food slurry (ketchup) processed at various cold homogenization pressures in accordance with the process 200 shown in FIG. 2. The food slurry was subjected to hot homogenization at a pressure of 3000 psig and a temperature of 180° F. and cold homogenization at a pressure of 3600 psig and a temperature between 100° F. and 110° F. (Note: the cold homogenization operation increased the discharge temperature by 15° F. due to heat caused by friction). As shown in chart 600, the relationship between viscosity and cold homogenization may be approximated by a linear function represented by best fit line 602.

EXAMPLE 1

Particle Size Reduction and Viscosity

The following example illustrates the effect of the addition of a cold PSR operation on the fiber particle size and viscosity of sample fiber-containing food slurries processed in accordance with the techniques described herein. In this example, a hot homogenized tomato product was homogenized at a pressure of 3000 psig and bottled ("Control"). Samples of the bottled tomato product were then collected. The samples were then analyzed and found to have an average fiber particle size of 246 micron and a viscosity of 5.0 cm/30sec Bostwick. Cold homogenization was then added as the last unit operation prior to bottling. Samples of the bottled tomato product were again collected and analyzed. The samples were found to have an average fiber particle size of 190 micron and a viscosity of 3.5 cm/30sec Bostwick. Thus, the average fiber particle size was reduced by 56 micron while the average viscosity was increased by 1.5 cm/30 sec Bostwick.

EXAMPLE 2

Particle Size Reduction

The following example illustrates the effect of the addition of a cold PSR operation on the fiber particle size of sample fiber-containing food slurries processed in accordance with the techniques described herein. In this example, two series of tests ("Test Series 1" and "Test Series 2") were conducted using prepared ketchup of generally identical formulation. In each test series, the ketchup was divided. A first portion of the ketchup was the processed using a cold homogenization process generally in accordance with process 200 of FIG. 2 ("Cold Homogenization Process"). Simultaneously, a second portion of the ketchup was processed without cold homogenization so that the ketchup was only subjected to hot homogenization ("Control Process"). All other process operations were kept the same. Cold homogenization was conducted at a pressure of 2900 psig and a temperature of 110° F.

Samples of the bottled ketchup were collected during the duration of the tests. These samples were analyzed using a Coulter laser diffraction analyzer LS 200 equipped with large fluid module to determine the mean and median fiber particle size of each sample. The results are summarized in Table 2. As shown, the average mean particle size was reduced by 84 micron (38.2%) in Test Series 1 and 75 micron (30.4%) in Test Series 2. Similarly, the average median particle size was reduced 62 micron (43.7%) in Test Series 1 and 62 micron (37.6%) in Test Series 2.

TABLE 2

EFFECT ON PARTICLE SIZE OF COLD HOMOGENIZATTON VERSUS STANDARD SINGLE HOT HOMOGENIZATION PROCESS
Mean and Median particle size in bottled ketchup (micron)

| Sample | Particle Size (micron) Cold Homogenization Process | | Particle Size (micron) Control Process | |
|---|---|---|---|---|
| | Mean | Median | Mean | Median |
| Testing Series 1 | | | | |
| 1 | 129 | 73 | 175 | 113 |
| 2 | 144 | 83 | 206 | 135 |
| 3 | 151 | 91 | 232 | 154 |
| 4 | 132 | 80 | 236 | 157 |
| 5 | 123 | 74 | 228 | 143 |
| 6 | 138 | 81 | 223 | 147 |
| 7 | 137 | 79 | 223 | 147 |
| 8 | 145 | 86 | 257 | 161 |
| 9 | 137 | 84 | 219 | 142 |
| 10 | 136 | 76 | 203 | 128 |
| 11 | 125 | 74 | 216 | 138 |
| Average | 136 | 80 | 220 | 142 |
| Testing Series 2 | | | | |
| 1 | 170 | 110 | 244 | 159 |
| 2 | 206 | 121 | 253 | 165 |
| 3 | 184 | 111 | 250 | 173 |
| 4 | 197 | 125 | 257 | 177 |
| 5 | 170 | 99 | 234 | 150 |
| 6 | 180 | 109 | 252 | 174 |
| 7 | 166 | 100 | 254 | 176 |
| 8 | 163 | 94 | 243 | 167 |
| 9 | 177 | 105 | 258 | 175 |

TABLE 2-continued

EFFECT ON PARTICLE SIZE OF COLD HOMOGENIZATTON VERSUS STANDARD SINGLE HOT HOMOGENIZATION PROCESS
Mean and Median particle size in bottled ketchup (micron)

| Sample | Particle Size (micron) Cold Homogenization Process | | Particle Size (micron) Control Process | |
|---|---|---|---|---|
| | Mean | Median | Mean | Median |
| 10 | 167 | 100 | 260 | 176 |
| 11 | 167 | 98 | 232 | 156 |
| 12 | 159 | 97 | 241 | 156 |
| 13 | 154 | 89 | — | — |
| 14 | 147 | 92 | 230 | 141 |
| Average | 172 | 103 | 247 | 165 |

[1] Particle Size Analyzer model: Coulter laser diffraction analyzer LS 200 equipped with large fluid module
[2] Finished product particle size is a function of initial raw material fiber particle size (tomato paste)

EXAMPLE 3

Viscosity

The following example illustrates the effect of the addition of a cold PSR operation on the viscosity of sample fiber-containing food slurries processed in accordance with the techniques described herein. In this example, a ketchup was produced with a lowered tomato solids content using cold homogenization to a ketchup having a normal (not lowered) tomato solids content that was produced without cold homogenization using a single hot homogenization process.

In the study, the viscosity of the ketchups was measured using a Bostwick consistometer (cm/30sec Bostwick). Thirteen (13) cases of ketchup produced using cold homogenization in addition to hot homogenization in accordance with process 200 of FIG. 2 (Cold Homogenization) were examined and compared to thirteen (13) cases of ketchup produced using a single hot homogenization process ("Control"). Two bottles of ketchup were randomly selected from each case. Each bottle was then analyzed in duplicate. Thus, in total, 52 samples were collected and analyzed (N=52).

The initial tomato fiber particle size of both the Control ketchup and the Cold Homogenized ketchup prior to hot homogenization was generally less than 400 micron. This particle size is typical of tomato paste used for remanufactured sauces such as ketchup (e.g., paste made from tomato juice "filtered" through a 0.060 inch to an 0.075 inch screen to remove seeds and large peel). The Control ketchup was made with 6.9% natural tomato soluble solids (NTSS), while the Cold Homogenization ketchup was made with 6.35% natural tomato soluble solids (NTSS). Thus, the Cold Homogenization ketchup contained approximately 8% less tomato solids than the Control ketchup.

As noted, the Cold Homogenization process included a cold homogenization operation that was not included in the Control process. All other unit operations were identical. The hot homogenization operation in both the Cold Homogenization process and the Control process was performed at a homogenization pressure of 3000 psig and a temperature of 180° F.±5° F. The cold homogenization operation was conducted at a homogenization pressure of 3600 psig and a temperature of 110° F.±5° F.

Figure 7:
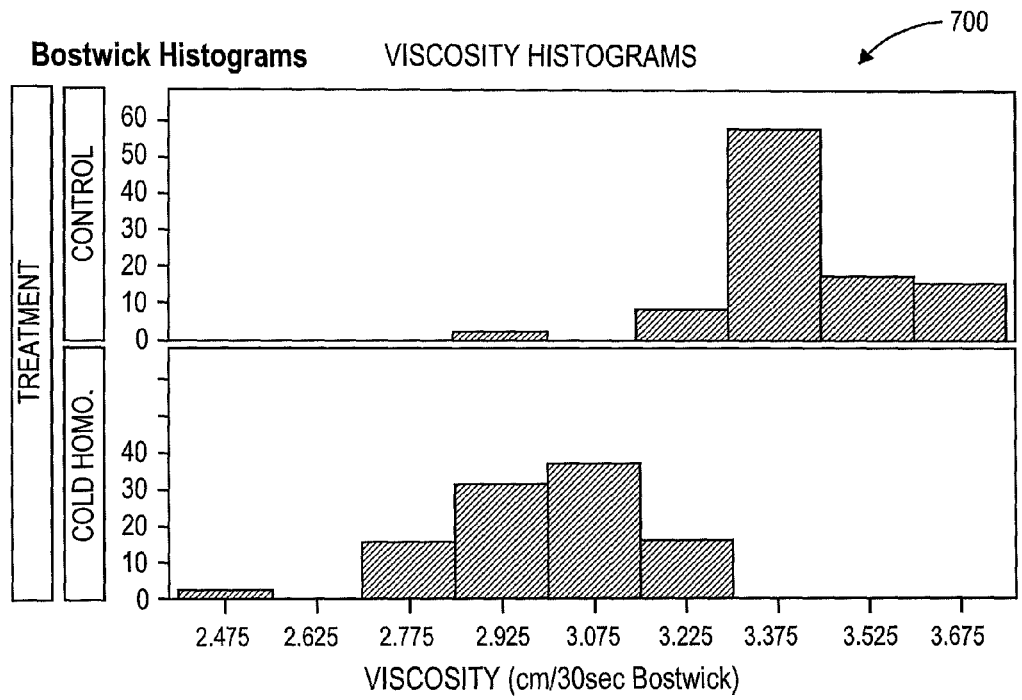
FIGS. 7 and 8 are charts comparing the viscosity (Bostwick) of a fiber-containing food slurry (ketchup) processed using a cold homogenization process such as the process shown in FIG. 2 with the viscosity of the same food slurry processed using a hot homogenization process only.
Figure 8:
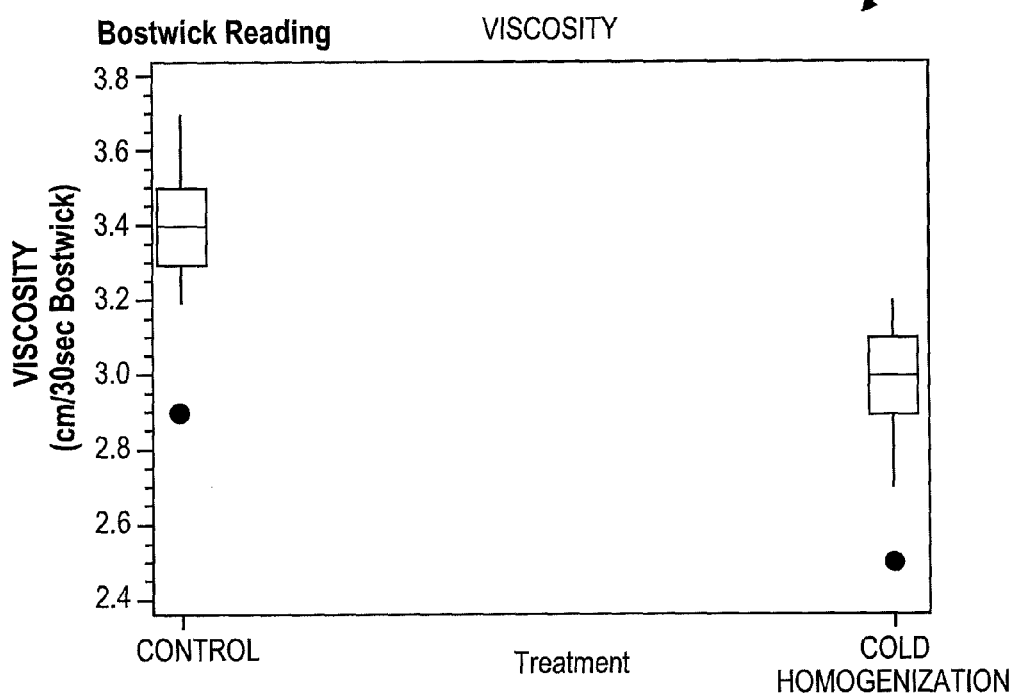

Results of the tests are illustrated in FIGS. 7 and 8. The mean viscosity for the Control ketchup was 3.40 cm/30 sec Bostwick with a 95% confidence interval from 3.34 cm/30 sec Bostwick to 3.46 cm/30 sec Bostwick. The mean viscosity for the Cold Homogenization ketchup was 2.97 cm/30 sec Bostwick with a 95% confidence interval from 2.91 cm/30 sec Bostwick to 3.03 cm/30 sec Bostwick. Therefore, the mean viscosity for the ketchup produced using cold homogenization and having less NTSS than the control ketchup was significantly lower (thicker) compared to the control ketchup produced using hot homogenization alone and having more NTSS than the Cold Homogenization ketchup, with a reduction of 0.43 cm/30 sec Bostwick and a 95% confidence interval (reduction range: 0.38 cm/30 sec Bostwick to 0.48 cm/30 sec Bostwick). These results are summarized in Table 3.

TABLE 3

EFFECT ON VISCOSITY OF COLD HOMOGENIZATION VERSUS STANDARD SINGLE HOT HOMOGENIZATION PROCESS

| Treatment | N | Mean | Std Dev | Minimum | Maximum | N | Lower 95% CL for Mean | Upper 95% CL for Mean |
|---|---|---|---|---|---|---|---|---|
| Control | 52 | 3.40 | 0.14 | 2.90 | 3.70 | 52 | 3.36 | 3.44 |
| Cold Homo. | 52 | 2.97 | 0.16 | 2.50 | 3.20 | 52 | 2.93 | 3.02 |

Conclusion

Although techniques have been described in language specific to structural features and/or methodological acts, it is to be understood that the appended claims are not necessarily limited to the specific features or acts described. Rather, the specific features and acts are disclosed as exemplary forms of implementing the claimed devices and techniques.

What is claimed is:

1. A process for manufacturing a tomato-based food slurry, the process comprising:
   receiving a tomato-based food slurry having a ratio of food fiber to soluble solids of from about 0.05 to about 2;
   deaerating the tomato-based food slurry;
   after deaerating the tomato-based food slurry, hot homogenizing the tomato-based food slurry under pressure;
   after hot homogenizing the tomato-based food slurry, pasteurizing the tomato-based food slurry by heating the tomato-based food slurry to a temperature of about 150° F. to about 300° F.;
   after pasteurizing the tomato-based food slurry, cooling the tomato-based food slurry;
   after cooling the tomato-based food slurry, cold homogenizing the tomato-based food slurry under pressure and at a temperature of about 35° F. to about 130° F.; and
   filling the tomato-based food slurry into a container.

2. The process of claim 1, wherein hot homogenizing includes homogenizing under pressure from about 500 psig to about 95,000 psig.

3. The process of claim 1, wherein hot homogenizing includes homogenizing under pressure from about 500 psig to about 5,000 psig.

4. The process of claim 1, wherein hot homogenizing includes homogenizing under pressure of about 3,000 psig.

5. The process of claim 1, wherein pasteurizing includes a hold period of at least about 10 minutes.

6. The process of claim 1, wherein cooling the tomato-based food slurry includes cooling the tomato-based food slurry to a temperature of about 35° F. to about 130° F.

7. The process of claim 1, wherein cooling the tomato-based food slurry includes cooling the tomato-based food slurry to a temperature of about 100° F.

8. The process of claim 1, wherein cold homogenizing includes homogenizing under pressure from about 3,000 psig to about 3,600 psig.

9. The process of claim 1, wherein the cold homogenization of the tomato-based food slurry is aseptic cold homogenization.

10. The process of claim 1, wherein after cold homogenizing the tomato-based food slurry, the tomato-based food slurry is pumped via a high shear pump to increase viscosity of the tomato based food slurry prior to filling.

11. A process for manufacturing a tomato-based food slurry, the process comprising: hot homogenizing a tomato based food slurry under pressure and at a temperature from about 150° F. to about 200° F.; pasteurizing the tomato-based food slurry by heating the tomato-based food slurry to a temperature of about 150° F. to about 300° F., the tomato-based food slurry having a ratio of food fiber to soluble solids of from about 0.05 to about 2; after pasteurizing the tomato-based food slurry, cooling the tomato-based food slurry; after cooling the tomato-based food slurry, cold homogenizing the tomato-based food slurry under pressure and at a temperature of about 35° F. to about 130° F.; and filling the tomato-based food slurry into a container.

12. The process of claim 11, wherein cooling the tomato-based food slurry includes cooling the tomato-based food slurry to a temperature of about 35° F. to about 130° F.

13. The process of claim 11, wherein cold homogenizing includes homogenizing under pressure from about 3,000 psig to about 15,000 psig.

14. The process of claim 11, further comprising pumping the tomato-based food slurry in a filling line after cold homogenizing and before filling into the containers, wherein the filling line is less than about 100 feet.

15. A process for manufacturing a tomato-based food slurry, the process comprising:
   receiving a tomato-based food slurry having a ratio of food fiber to soluble solids of from about 0.05 to about 2;
   hot homogenizing the tomato-based food slurry under pressure and at a temperature from about 150° F. to about 200° F.;
   after hot homogenizing the tomato-based food slurry, pasteurizing the tomato-based food slurry by heating the tomato-based food slurry to a temperature of about 150° F. to about 300° F.;
   after pasteurizing the tomato-based food slurry, cooling the tomato-based food slurry;
   after cooling the tomato-based food slurry, cold homogenizing the tomato-based food slurry under pressure and at a temperature of about 35° F. to about 130° F.;
   after cold homogenizing the tomato-based food slurry, measuring the viscosity of the tomato-based food slurry with an inline viscosity meter to determine whether the viscosity of the tomato-based food slurry is within a range of a predetermined viscosity;
   after measuring the viscosity of the tomato-based food slurry with the inline viscosity meter, adjusting the pressure for cold homogenization to maintain the viscosity of the tomato-based food slurry within the range of the predetermined viscosity; and after measuring the viscosity of the tomato-based food slurry with the inline viscosity meter, filling the tomato-based food slurry into a container.

16. The process of claim 15, wherein the inline viscosity meter includes at least one of an inline Bostwick meter or an inline viscometer.

17. The process of claim 15, wherein adjusting the pressure for cold homogenization to maintain the viscosity of the tomato-based food slurry within the range of the predetermined viscosity includes adjusting the pressure for cold homogenization under control of an electronic controller implementing an algorithm to maintain the viscosity of the tomato-based food slurry within the range of the predetermined viscosity.

18. The process of claim 17, wherein the algorithm correlates viscosity of the tomato-based food slurry following cold homogenization with tomato-based food slurry homogenization pressure.

19. The process of claim 1, further including automatically adjusting a pressure of the cold homogenizing step according to a feedback control loop.

* * * * *

UNITED STATES PATENT AND TRADEMARK OFFICE
CERTIFICATE OF CORRECTION

PATENT NO. : 8,962,056 B2
APPLICATION NO. : 13/580447
DATED : February 24, 2015
INVENTOR(S) : Jorge K. Succar et al.

It is certified that error appears in the above-identified patent and that said Letters Patent is hereby corrected as shown below:

Title Page

The Assignee (73) listed on the Letters Patent has the following type: ConAgra Foods EDM, Inc.

The Assignee should be listed as: ConAgra Foods RDM, Inc.

Signed and Sealed this
Ninth Day of June, 2015

Michelle K. Lee
*Director of the United States Patent and Trademark Office*